United States Patent [19]

Abel et al.

[11] Patent Number: 4,705,525

[45] Date of Patent: Nov. 10, 1987

[54] WATER-SOLUBLE OR WATER-DISPERSIBLE GRAFT POLYMERS, PROCESS FOR THEIR PREPARATION AND THE USE THEREOF

[75] Inventors: Heinz Abel, Reinach, Switzerland; Paul Schäfer, Oberried, Fed. Rep. of Germany; Hans-Ulrich Berendt, Allschwil, Switzerland

[73] Assignee: CIBA-GEIGY Corporation, Ardsley, N.Y.

[21] Appl. No.: 876,033

[22] Filed: Jun. 19, 1986

[30] Foreign Application Priority Data

Jun. 28, 1985 [CH] Switzerland ............ 2751/85-7

[51] Int. Cl.$^4$ ............ C08F 283/06; D06P 1/61
[52] U.S. Cl. ............ 8/555; 8/580; 8/582; 8/609; 8/648; 8/917; 8/918; 8/922; 8/924; 8/927; 525/404; 525/403
[58] Field of Search ............ 8/555, 580, 582, 609, 8/558; 525/404

[56] References Cited

U.S. PATENT DOCUMENTS 2,763,530  9/1956  Schuetz et al. ............ 8/604
4,612,352  9/1986  Schafer et al. ............ 525/404

FOREIGN PATENT DOCUMENTS 52-025183  8/1975  Japan .
967332  8/1964  United Kingdom .
1410703  10/1975  United Kingdom .

OTHER PUBLICATIONS

Chemical Abstract 86:156966f, 39 Textiles, vol. 86, (1977).

Primary Examiner—A. Lionel Clingman
Attorney, Agent, or Firm—Edward McC. Roberts; Meredith C. Findlay

[57] ABSTRACT

Water-soluble or water-dispersible graft polymers which comprise (a) as main chain, a polyalkylene glycol, in particular polyethylene glycol, which is esterified at the two terminal hydroxyl groups with a long chain fatty acid of 8 to 26, preferably 10 to 22, carbon atoms, and (b) grafted ethylenically unsaturated monomers, preferably acrylic acid or acrylamide, in the form of side chains at individual carbon atoms of the polyalkylene glycol chain.

These graft polymers are particularly suitable for use as anticrease agents for dyeing, whitening, bleaching or washing textile materials, e.g. textiles containing cellulosic fibres, natural or synthetic polyamide fibres, polyacrylonitrile fibres or, in particular, for dyeing or whitening cotton or polyester fibres.

20 Claims, No Drawings

WATER-SOLUBLE OR WATER-DISPERSIBLE GRAFT POLYMERS, PROCESS FOR THEIR PREPARATION AND THE USE THEREOF

The present invention relates to novel water-soluble or water-dispersible graft polymers, to their preparation, and to the use thereof as anticrease agents for textile materials.

The graft polymers of this invention comprise (a) as main chain, a polyalkylene glycol which is esterified at the two terminal hydroxyl groups with a long chain fatty acid of 8 to 26, preferably of 10 to 22, carbon atoms, and (b) grafted ethylenically unsaturated monomers in the form of side chains at individual carbon atoms of said polyalkylene glycol chain.

Depending on the structure of the polymer (main chain) and on the nature of the grafted side chains, the novel graft polymers may be water-soluble or water-dispersible.

Water-soluble graft polymers contain hydrophilic graft components which preferably carry acid water-solubilising groups, e.g. carboxyl groups and/or sulfonic acid groups as well as amide groups.

Suitable grafting substrates are the diesters of polyalkylene glycols obtained from 2 to 200 moles, preferably from 4 to 100 moles, of alkylene oxide, e.g. ethylene oxide, propylene oxide or mixtures of ethylene oxide and propylene oxide. It is preferred to use diesters of these polyalkylene glycols with long chain fatty acids of 12 to 22 carbon atoms. The unesterified polyalkylene glycols desirably have a molecular weight of 200 to 4400, preferably from 300 to 1600 and, most preferably, from 300 to 1000. The esterification of the polyalkylene glycols is effected by reaction with 2 moles of a fatty acid. It is also possible first to add alkylene oxide to the fatty acid and then to esterify the fatty acid/alkylene oxide adduct with the same or another fatty acid. The fatty acids may be saturated or unsaturated and are e.g. caprylic acid, capric acid, lauric acid, myristic acid, palmitic acid, coconut fatty acid, stearic acid, tallow fatty acid, arachidic acid, behenic acid, lignoceric acid or cerotinic acid, and decenoic, dodecenoic, tetradecenoic, hexadecenoic, oleic, eleostearic, linoleic, linolenic, ricinoleic or arachidonic acid. Solid fatty acids such as tallow fatty acid, palmitic acid, arachidic acid, behenic acid and, in particular, stearic acid, are preferred.

Suitable ethylenically unsaturated polymerisable monomers which are used grafting side chains onto the polyalkylene oxide adducts referred to above as main chain are monomers that contain hydrophilic groups as well as nitrogen-containing vinyl compounds.

Monomers that contain hydrophilic groups may be carboxylic acids, dicarboxylic acids or the anhydrides thereof, as well as sulfonic acids which contain an ethylenically unsaturated aliphatic radical and not more than 7 carbon atoms.

Examples of monocarboxylic acids are acrylic acid, methacrylic acid, α-haloacrylic acid, 2-hydroxyethylacrylic acid, α-cyanoacrylic acid, crotonic acid and vinylacetic acid. Ethylenically unsaturated dicarboxylic acids are preferably fumaric acid, maleic acid or itaconic acid, and also mesaconic acid, citraconic acid, glutaconic acid and methylenemalonic acid. The preferred anhydride of these acids is maleic anhydride.

Suitable sulfonic acids are e.g. vinylsulfonic acid or 2-acrylamido-2-methylpropanesulfonic acid. Preferably they are monocarboxylic acids of 3 to 5 carbon atoms, in particular methacrylic acid and, most particularly, acrylic acid.

Examples of polymerisable nitrogen-containing vinyl compounds are unsubstituted or N-substituted amides or imides as well as nitriles of ethylenically unsaturated aliphatic mono- or dicarboxylic acids, e.g. acrylamide, methacrylamide, maleimide, vinylidene cyanide, acrylonitrile or methacrylonitrile, and N-vinyl derivatives of nitrogen-containing 5- or 6-membered heterocycles such as N-vinylpyrrolidone or vinyl pyridine.

The polymerisable monomers required for grafting on the side chains may be employed singly or in admixture with each other. Preferred grafting monomers are acrylic acid and acrylamide.

Particularly interesting graft polymers of this invention contain, as main chain, radicals of a polyethylene glycol obtained from 3 to 100 moles, preferably of 4 to 40 moles, of ethylene oxide and, as side chains, grafted acrylic acid or acrylamide, said polyethylene glycol being esterified with a fatty acid of 12 to 22 carbon atoms.

Among these products, those graft polymers are preferred that contain, as main chain, the radical of an adduct of 4 to 40 moles, preferably of 6 to 20 moles, of ethylene oxide, which adduct is esterified at the two hydroxyl end groups with palmitic acid, behenic acid and, preferably, with stearic acid.

Particularly suitable graft polymers are reaction products of acrylic acid or acrylamide and polyethylene glycols obtained from 6 to 15 moles of ethylene oxide and which are esterified with stearic acid.

The graft polymers of this invention preferably contain 15 to 80% by weight of the defined esterified alkylene oxide adduct as main chain and 85 to 20% by weight of ethylenically unsaturated grafted monomer, preferably acrylic acid or acrylamide, as side chains.

Most preferably the graft polymers contain 20 to 75% by weight of the defined esterified polyalkylene glycol, in particular polyethylene glycol as main chain, and 80 to 25% by weight of grafted acrylic acid or acrylamide as side chains.

The graft polymers of the present invention are prepared by methods which are known per se, conveniently by combining (1) a polyalkylene glycol having a polyglycol ether chain of 2 to 200

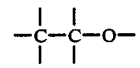

groups and which is esterified at both hydroxyl end groups with a fatty acid of 8 to 26 carbon atoms, and (2) an ethylenically unsaturated polymerisable monomer which preferably contains hydrophilic groups, for example corresponding carboxylic acids and the anhydrides thereof or sulfonic acids and the amides thereof, and polymerising the components in the presence of a catalyst, conveniently in the temperature range from 40° to 100° C. The reaction products so obtained are mainly graft polymers in which the alkylene oxide adduct forms the main chain onto individual carbon atoms of which the ethylenically unsaturated monomer, in particular acrylic acid or acrylamide, is grafted on in the form of side chains.

It is convenient to use as catalysts free radical forming organic or, preferably, inorganic initiators. Suitable organic initiators for carrying out the radical polymerisation are for example symmetrical peroxide dicarbonates, butyl peroctoates, butyl perbenzoates, peracetates or peroxide dicarbamates. Suitable inorganic initiators are hydrogen peroxide, perborates, persulfates or peroxide sulfates. The preferred initiator or activator is potassium persulfate.

These catalysts may be may be employed in amounts of 0.05 to 5% by weight, preferaly 0.05 to 2% by weight and, most preferably, 0.1 to 1% by weight, based on the starting materials.

It is preferred to carry out the graft polymerisation in an inert atmosphere, e.g. in a nitrogen atmosphere.

The polymers are obtained as solutions or as viscous solutions. Products suitable for use in practice having a solids content of e.g. 2 to 35% by weight, preferably 5 to 25% by weight, can be obtained by diluting the polymers or—depending on the nature of the grafted monomers—by dissolving them and diluting the solution so obtained with water. To preserve the aqueous solutions of the graft polymers and/or to improve their storage stability, preservatives such as chloroacetamide, N-hydroxymethyl chloroacetamide, pentachlorophenolates, alkali metal nitrites, triethanolamine or, preferably, 4-hydroxyanisole, or also bactericides such as sodium azide or surface-active quaternary ammonium compounds containing one or two fatty alkyl radicals, may be added. Mixtures of these preservatives and antimicrobial compounds can also be added with advantage to the mixtures.

The preferred 5 to 25% solutions of the graft polymers have a viscosity at 25° C. of 500 to 40,000, preferably from 3000 to 25,000, mPa.s (milli-Pascal seconds).

The novel polymers have interesting repellent effects and are used in particular as anticrease agents for dyeing cellulosic fibres, polyester fibres, synthetic polyamide fibres or blends of these fibres, as well as for dyeing wool or polyacrylonitrile fibres, as they counteract the adhesive strength of the textile material and so prevent creasing. They increase the rate of diffusion of the dye in the fibres and thereby increase the dye field. In addition, they have foam inhibiting properties. However, they can also be used in wash liquors or pretreatment liquors such as bleaching liquors.

Accordingly, the present invention also relates to a process for dyeing or whitening textile material containing cellulosic fibres, natural or synthetic polyamide fibres, polyacrylonitrile fibres and, in particular, polyester fibres, with correspondingly suitable dyes and fluorescent whitening agents, which process comprises dyeing or whitening said textile material in the presence of the graft polymer of this invention.

The amounts in which the graft polymers are added to the dyebaths or whitening liquors vary from 1 to 10% by weight, preferably from 2 to 5% by weight, based on the weight of the textile material.

Suitable cellulosic material is that made of regenerated or, preferably, natural cellulose, for example viscous staple fibre, viscose rayon, hemp, linen, jute or, preferably, cotton.

Cellulosic fibre materials are normally dyed with substantive dyes, vat dyes, leuco-vat ester dyes or, preferably, with reactive dyes.

Suitable substantive dyes are the customary direct dyes, for example those listed under the heading "Direct Dyes" in the Colour Index, 3rd Edition (1971), Vol. 2, on pages 2005–2478.

The vat dyes are higher condensed and heterocyclic benzoquinones or naphthoquinones, sulfur dyes and, in particular, anthraquinoids or indigoid dyes. Examples of eligible vat dyes will be found in the Colour Index, 3rd Edition (1971), Vol. 3, under the headings "Sulfur Dyes" and "Vat Dyes" on pages 3469 to 3837.

The leuco vat ester dyes can be obtained e.g. from vat dyes of the indigo, anthraquinone or indanthrene series by reduction with e.g. iron powder and subsequent esterification with e.g. chlorosulfonic acid, and are listed in the Colour Index, 3rd Edition, 1971, Vol. 3, as "Solubilised Vat Dyes".

By reactive dyes are meant the customary dyes that form a covalent bond with cellulose, e.g. those listed under the heading "Reactive dyes" in the Colour Index, Vol. 3, 3rd Edition (1971), on pages 3391–3560, and in Vol. 6, revised 3rd Edition (1975), on pages 6268–6345.

Suitable polyamide fibre materials, in particular textiles, which can be dyed in the presence of the novel graft polymers are e.g. those obtained from adipic acid and hexamethylenediamine (polyamide 6,6), from ε-caprolactam (polyamide 6), from ω-aminoundecanoic acid (polyamide 11), from ω-aminoenanthic acid (polyamide 7), from ω-aminopelargonic acid (polyamide 8), or from sebacic acid and hexamethylenediamine (polyamide 6,10).

Synthetic or natural polyamide fibre materials are normally dyed with anionic dyes.

The anionic dyes are e.g. salts of heavy metal-containing dyes or, preferably, of metal-free azomethine, monoazo, disazo or polyazo dyes including formazane dyes, as well as anthraquinone, xanthene, nitro, triphenylmethane, naphthquinone-imine and phthalocyanine dyes. The anionic character of these dyes can be imparted by metal complexing alone and/or preferably by acid salt-forming substituents such as carboxylic acid groups, sulfuric acid ester and phosphoric acid ester groups, phosphonic acid groups or, preferably, sulfonic acid groups. These dyes can also contain in the molecule reactive groups which form a covalent bond with the polyamide. These last mentioned dyes preferably contain only one single sulfonic acid group and, may contain a further water-solubilising group such as the acid amide group or alkylsulfonyl group which, however, is not a salt-forming group.

Particularly interesting dyes are 1:1 or, preferably, 1:2 metal complex dyes. The 1:1 metal complex dyes preferably contain one or two sulfonic acid groups. As metal they contain a heavy metal atom, e.g. a copper, nickel or, preferably, chromium atom.

The 1:2 metal complex dyes contain, as central metal atom, a heavy metal atom, e.g. a cobalt or, preferably, a chromium atom. Attached to the central atom are two complexing components, at least one of which, but preferably each of which, is a dye molecule. Moreover, both dye molecules participating in the complexing can be identical or different. The 1:2 metal complex dyes can contain e.g. two azomethine molecules, one disazo and one monoazo dye molecules or, preferably, two monoazo dye molecules. The azo dye molecules can contain water-solubilising groups, e.g. acid amide, alkylsulfonyl or the above mentioned acid groups. Preferred metal complex dyes are 1:2 cobalt or 1:2 chromium complex dyes of monoazo dyes which contain acid amide or alkylsulfonyl groups or altogether a single sulfonic acid group. Mixtures of anionic dyes may also be used.

Suitable polyester fibre material which can be dyed or whitened in the presence of the graft polymer is e.g. material made from cellulose esters, such as cellulose 2½-acetate and cellulose triacetate fibres, and especially linear polyester fibres. Linear polyester fibres shall be understood as meaning synthetic fibres which are obtained e.g. by condensation of terephthalic acid with ethylene glycol or of isophthalic acid or terephthalic acid with 1,4-bis-(hydroxymethyl)cyclohexane, as well as copolymers of terephthalic acid and isophthalic acid and ethylene glycol. The linear polyester used up to now almost exclusively in the textile industry is that derived from terephthalic acid and ethylene glycol.

The disperse dyes to be used for dyeing polyester fibre materials, which dyes are soluble in water to only a very limited degree and are present in the dye liquor for the most part in the form of a fine dispersion, may belong to a wide range of dyestuff classes, for example to the acridone, azo, anthraquinone, coumarin, methine, perinone, naphthoquinone-imine, quinophthalone, styryl or nitro dyes. Mixtures of disperse dyes may also be used in the process of the invention.

Polyacrylonitrile fibres are preferably dyed with cationic dyes. Suitable cationic dyes are migrating as well as non-migrating dyes. Suitable migrating cationic dyes are in particular those which carry a partially or completely delocalised positive charge and have a cation weight lower than 310, whose parachor is smaller than 750 and whose log P is smaller than 3.2. The parachor is calculated in accordance with the article by O. R. Quayle in Chem. Rev. 53, 439 (1953), and log P denotes the relative lipophilic value as calculated by C. Hanach et al., in J. Med. Chem. 16, 1207 (1973).

Non-migrating cationic dyes are in particular those dyes whose cation weight is greater than 310 and whose parachor is greater than 750.

The cationic migrating and non-migrating dyes may belong to various classes of dye. In particular, they comprise the customary salts, for example chlorides, sulfates or metal halides, for example zinc chloride double salts, of azo dyes such as monoazo or hydrazone dyes, anthraquinone, diphenylmethane, triphenylmethane, methine, azomethine dyes, coumarin, ketone-imine, cyanine, xanthene, azine, oxazine or thiazine dyes.

Mixtures of cationic dyes can also be used. It is especially preferred to use combinations of at least two or, preferably, three migrating or non-migrating cationic dyes for producing level dichromatic or trichromatic dyeings, for which utility mixtures of migrating and non-migrating cationic dyes may also be used.

The fibre materials can also be employed as blends with another or with other fibres, e.g. blends of polyacrylonitrile/polyester, polyamide/polyester, polyester/cotton, polyester/viscose, polyacrylonitrile/wool and polyester/wool.

Blends of polyester and cotton are normally dyed with combinations of disperse dyes and vat dyes, sulfur dyes, leuco vat ester dyes, direct dyes or reactive dyes, the polyester component being dyed beforehand, simultaneously or subsequently with disperse dyes.

Polyester/wool blends are preferably dyed in the practice of this invention with commercially available mixtures of anionic dyes and disperse dyes.

The textile material can be in different forms of presentation, with piece goods such as knitted or woven fabrics being preferred.

The novel polymers may also be used for whitening undyed natural or synthetic fibre materials with fluorescent whitening agents which depending on the agent and the material to be treated may be dissolved or dispersed in water. The fluorescent whitening agents may belong to any class of such compounds. In particular they are coumarins, triazole coumarins, benzocoumarins, oxazines, pyrazines, pyrazolines, diphenyl pyrazolines, stilbenes, styryl stilbenes, triazolyl stilbenes, bisbenzoxazolyl ethylenes, stilbene bisbenzoxazoles, phenylstilbene oxazoles, thiophene bis-benzoxazoles, naphthalene bis-benzoxazoles, benzofuranes, benzimidazoles and naphthalimides. Mixtures of fluorescent whitening agents may also be used in the practice of this invention.

The amount of dye or fluorescent whitening agent to be added to the liquor depends on the desired colour strength. In general, amounts of 0.01 to 10% by weight, preferably 0.2 to 5% by weight, based on the weight of the textile material employed, are advantageous.

Depending on the textile material to be treated, the dyebaths or whitening baths may also contain, in addition to the dyes or fluorescent whitening agents and graft polymers of the invention, wool protecting agents, oligomer inhibitors, oxidants, antifoams, emulsifiers, levelling agents, retarders and, preferably, dispersants.

The dispersants are used in particular for obtaining a good dispersion of the disperse dyes. Suitable dispersants are those customarily employed in dyeing with disperse dyes. Preferred dispersants are sulfated or phosphated adducts of 15 to 100 moles of ethylene oxide or preferably propylene oxide with polyhydric aliphatic alcohols containing 2 to 6 carbon atoms, e.g. ethylene glycol, glycerol or pentaerythritol, or with amines containing 2 to 9 carbon atoms and at least two amino groups or one amino group and one hydroxyl group, as well as alkylsulfonates containing 10 to 20 carbon atoms in the alkyl chain, alkylbenzenesulfonates with straight or branched alkyl chain containing 8 to 20 carbon atoms, e.g. nonyl- or dodecylbenzenesulfonate, 1,3,5,7-tetramethyloctylbenzenesulfonate or octadecylbenzenesulfonate, and alkylnaphthalenesulfonates or sulfosuccinates, such as sodium dioctylsulfosuccinate.

Particularly suitable anionic dispersants are lignosulfonates, polyphosphates and, preferably, condensates of formaldehyde and aromatic sulfonic acids, formaldehyde and, optionally, mono- or bifunctional phenols, e.g. condensates of cresol, β-naphtholsulfonic acid and formaldehyde, of benzenesulfonic acid, formaldehyde and naphthalenesulfonic acid, of naphthalenesulfonic acid and formaldehyde, or of naphthalenesulfonic acid, dihydroxydiphenylsulfone and formaldehyde. The preferred anionic dispersant is the disodium salt of di-(6-sulfonaphth-2-yl)methane.

Mixtures of anionic dispersants may also be employed. The anionic dispersants will usually be in the form of their alkali metal salts, ammonium salts or amine salts. These dispersants are preferably employed in an amount of 0.1 to 5 g/l of treatment liquor.

Depending on the dye and substrate to be employed, the dyebaths or whitening baths may also contain, in addition to the above mentioned assistants, conventional assistants, preferably electrolytes such as salts, e.g. sodium sulfate, ammonium sulfate, sodium or ammonium phosphates or sodium or ammonium polyphosphates, metal chlorides or metal nitrates such as calcium chloride, magnesium chloride or calcium nitrate, ammonium acetate or sodium acetate and/or acids, e.g. mineral acids, such as sulfuric acid or phosphoric acid, or organic acids, preferably lower aliphatic carboxylic acids, such as formic acid, acetic acid or oxalic acid, as well as alkalies or alkali donors and chelating agents. The acids are used in particular for adjusting the pH value of the dyebaths employed in the invention. The pH value is ordinarily in the range from 4 to 6.5, preferably from 4.5 to 6.

When using reactive dyes, the liquors will normally contain fixation alkalies.

Examples of suitable alkaline compounds for fixing the reactive dyes are sodium carbonate, sodium bicarbonate, sodium hydroxide, disodium phosphate, trisodium phosphate, borax, aqueous ammonia or an alkali donor, e.g. sodium trichloroacetate. A particularly useful alkali is a mixture of water glass and a 30% aqueous solution of sodium hydroxide.

The pH of the alkaline dyebaths is normally in the range from 7.5 to 12.5, with the preferred range being from 8.5 to 11.5.

Dyeing or whitening is performed advantageously from an aqueous liquor by the exhaust method. The liquor to goods ratio can accordingly be chosen within a wide range, e.g. from 1:4 to 1:100, preferably from 1:6 to 1:50. The dyeing or whitening temperature is not less than 70° C. and is usually not higher than 140° C. Preferably it is in the range from 80° to 135° C.

Linear polyester fibres and cellulose triacetate fibres are preferably dyed by the high temperature process in closed and, advantageously, also in pressure-resistant apparatus in the temperature range above 100° C., preferably in the range from 110° to 135° C., and under normal or elevated pressure. Examples of suitable closed dyeing machines are circulating liquor machines such as cheese dyeing and beam dyeing machines, winch becks, jet dyeing or rotary dyeing machines, muff dyeing machines, paddles or jiggers. Cellulose 2½-acetate fibres are preferably dyed at temperatures from 80° to 85° C.

If the material to be dyed is cellulosic fibre material or synthetic polyamide material alone, dyeing is conveniently carried out in the temperature range from 20° to 106° C., preferably from 30° to 95° C., for cellulose fibres, and from 80° to 95° C. for polyamide fibres.

Polyester/cotton blends are preferably dyed in the temperature range above 106° C., most preferaly in the range from 110° to 135° C. These blends can be dyed in the presence of a carrier or mixture of carriers which act as dyeing accelerators for dyeing the polyester component with disperse dyes.

The dyeing procedure can be carried out by treating the goods first briefly with the graft polymer and then dyeing them, or preferably by treating the goods simultaneously with the graft polymer and the dye.

The dyeings are aftertreated by cooling the dyebath to 60°–80° C., rinsing them with water and, if desired, effecting a reductive afterclear in alkaline medium in conventional manner. The dyeings are then once more rinsed and dried. When using carriers, the dyeings are conveniently subjected to a heat treatment, e.g. a thermosol treatment, in order to improve the lightfastness. This heat treatment is preferably carried out in the temperature range from 160° to 180° C. over 30 to 90 seconds. When dyeing the cellulose constituent with vat dyes, the goods are first treated with hydrosulfite at a pH of 6 to 12.5 and then with an oxidising agent, and finally given a washing off.

The process of the invention gives level and intense dyeings which are distinguished by good dye yields. In particular, level dyeings are obtained, and the material has a crease-resistance rating of 2–4 according to the Monsanto standard and has a level appearance and a pleasing soft handle. In addition, the fastness properties of the dyeings, e.g. lightfastness, crockfastness and wetfastness, are not impaired by the use of the graft polymer of the invention. Further, no troublesome foaming occurs when dyeing textile material in the presence of the composition of the invention.

In the following Preparatory and Application Examples, parts and percentages are by weight, unless otherwise indicated. The indicated amounts of dye refer to commercially available, i.e. diluted, product, and the indicated amounts of the components of the composition refer to pure substance. Five-figure Colour Index (C.I.) numbers refer to the 3rd Edition of the Colour Index.

PREPARATORY EXAMPLES

Example 1:

12.5 g of polyethylene glycol 600 distearate and 40 g of deionised water are heated to 90° C. under nitrogen. Then 37.5 g of acrylic acid and a solution of 0.2 g of potassium persulfate in 20 g of deionised water are added simultaneously dropwise over the course of 30 minutes. The mixture is stirred for 1 hour and then a further solution of 0.1 g of potassium persulfate in 10 g of deionised water is added dropwise. The batch is kept for 3 hours at 90° C., then cooled to room temperature, and finally adjusted to a solids content of 25% by weight by addition of 2 ml of a 30% aqueous solution of sodium hydroxide and 80 ml of deionised water. This solution has a viscosity of 11300 mPa·s at 25° C. The surface tension at 25° C. is 43.7 dyn/cm, measured in a 0.2% solution.

Example 2:

14.0 g of acrylamide, 6.0 g of polyethylene glycol 400 distearate, 80.0 g of deionised water and 0.1 g of potassium persulfate are heated to 80° C. under nitrogen. The reaction mass is kept stirrable by addition of a total of 83 g of deionised water during the polymerisation. After a reaction time of 1 hour, a solution of 0.005 g of potassium persulfate in 20.0 g of deionised water is added dropwise and the polymerisation is allowed to go to completion over 3 hours. The batch is cooled to room temperature and then 0.2 g of chloroacetamide and 0.2 g of 4-hydroxyanisole are added to stabilise the reaction mass. The reaction mass contains 10% by weight of graft polymer and has a viscosity of 4800 mPa·s measured at 25° C. The surface tension is 38.4 dyn/cm, measured in a 0.2% solution.

Poloyethylene glycol 400 distearate is prepared as follows:

120 g of polyethylene glycol (mol. wt. 400), 227.2 g of stearic acid and 0.5 ml of concentrated sulfuric acid ($d_4^{20}=1.83$ g/cm$^3$) are heated to 160° C. in a nitrogen atmosphere. Then 14 ml of water are distilled off as an azeotrope over 2½ hours. The acid number, determined by titrimetric analysis, is 2.0 (mg KOH/g). After filtration through a cloth filter, polyethylene glycol 400 distearate is obtained in a yield of 372 g.

Example 3:

4.0 g of polyethylene glycol 400 distearate and 20 g of deionised water are heated to 80° C. under nitrogen. The separate and simultaneous dropwise addition of a solution of 16.0 g of acrylamide in 50 ml of deionised water and a solution of 0.1 g of potassium persulfate in 20 ml of deionised water is then made over 40 minutes.

The reaction mixture is kept for 3 hours at 80° C., cooled to room temperature and stabilised by the addition of 0.2 g of chloroacetamide and 0.2 g of 4-hydroxyanisole. The reaction mass has a solids content of 18.5% by weight and has a viscosity of 21000 mPa·s measured at 25° C. The surface tension is 38.2 dyn/an measured in a 0.2% solution.

Example 4:

20 g of polyethylene glycol 1540 distearate and 40 ml of deionised water are heated to 90° C. in a nitrogen atmosphere. Then the separate and simultaneous dropwise addition of 30 g of acrylic acid and a solution of 0.15 g of potassium persulfate in 20 ml of deionised water is made over 1 hour. After a reaction time of 1 hour, a further solution of 0.1 g of potassium persulfate in 10 ml of deionised water is added dropwise and polymerisation is allowed to continue for a further 2 hours. Then 80 ml of deionised water and 5 ml of a 30% solution of sodium hydroxide are added and the reaction product is stirred until homogeneous. The reaction solution has a solids content of 25% by weight and a viscosity of 15500 mPa·s, measured at 25° C. The surface tension is 45.2 dyn/an, measured in a 0.2% solution.

Example 5:

32.5 g of polyethylene glycol 400 distearate, 10.0 g of acrylic acid, 0.2 g of dibenzoyl peroxide and 40 ml of deionised water are heated to 90° C. under nitrogen. After initiation of polymerisation, 22.5 g of acrylic acid are added dropwise over 40 minutes while keeping the batch stirrable by adding deionised water from time to time in 10 ml portions up to a total amount of 150 ml. After a reaction time of 2 hours, 0.1 g of potassium persulfate in 10 ml of deionised water is added dropwise and polymerisation is continued for a further hour. The batch is stirred cold and 2 ml of a 30% aqueous solution of sodium hydroxide are added. The batch has a solids content of 24.5% by weight.

APPLICATION EXAMPLES

Example 1:

100 g of texturised polyester knitted fabric are dyed in 2.4 liters of water on a laboratory jet dyeing machine with the following ingredients:

2 g of a dye of the formula

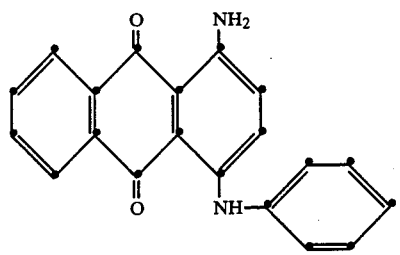
(101)

5 g of ammonium sulfate 1 g of the ammonium salt of the sulfated polyadduct of propylene oxide and glycerol with an average molecular weight of 3200, 3 g of the graft polymer of Example 2, and 0.2 g of 85% formic acid.

The above ingredients are first dissolved or dispersed in water and added to the dyebath at 70° C. The dyeing temperature is then raised over 60 minutes to 127° C. and the goods are dyed for a further 60 minutes at this temperature. The bath is then cooled to 20° C. over 4 minutes and the goods are then rinsed and dried. A level blue dyeing is obtained.

The dyed goods have a rating of 3 according to the Monsanto standard (test of crease resistance). The rating is only 1 without the addition of the graft polymer.

Example 2:

100 kg of a polyester/wool (55-45) blended fabric are treated on a winch beck at 50° C. with a dye liquor which contains 1 kg of a 7:3 mixture of the dyes of formulae

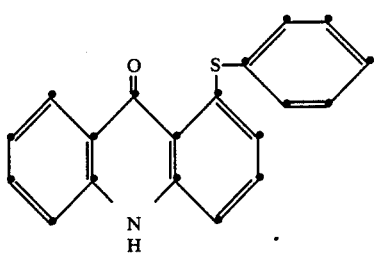
(102)

and

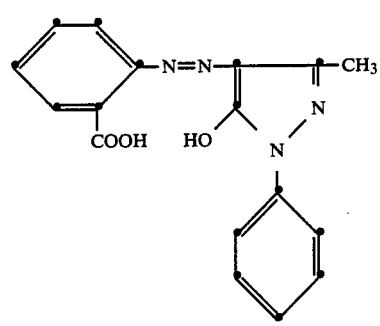
(103)

1:2 Cr—complex 0.8 kg of the sodium salt of ethylenediaminetetraacetic acid 4 kg of the reaction product of naphthalenesulfonic acid and formaldehyde 2 kg of an amphoteric fatty amine polyglycol ether sulfate and 3 kg of the graft polymer of Example 3 in 4000 liters of water. The temperature is then raised to 107° C. over 30 minutes and the goods are dyed for 1 hour at this temperature. The bath is then cooled to 40° C. and the fabric is then rinsed and dried. A level, fast, yellow dyeing is obtained. The dyebath does not foam during the entire duration of the dyeing procedure.

According to the Monsanto standard, the dyed goods are rated 2–3.

Example 3:

A high temperature dyeing machine which contains 100 kg of polyester/cotton (67:33) fabric in 3000 liters of water of 60° C., is initially charged with the following ingredients:

2 kg of a mixture of the dyes of formulae

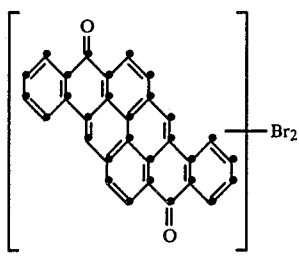
(104)

and

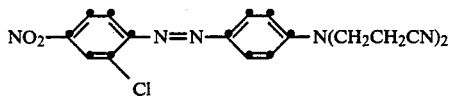
(105)

6 kg of ammonium sulfate and
0.6 kg of a fatty alkylbenzimidazole sulfonate.

Then 4 kg of the graft polymer of Example 4 are added. The pH of the dyebath is adjusted to 5 with 85% formic acid and the goods are allowed to circulate for 15 minutes. The temperature is then raised to 125° C. over 50 minutes and the goods are treated for 90 minutes at this temperature. The bath is then cooled to 70° C. and the following further ingredients are added in order to develop the vat dye:

9 kg of 30% sodium hydroxide solution
9 kg of 40% hydrosulfite and
5 kg of sodium chloride.

The goods are subsequently treated for 45 minutes at 70° C., then rinsed, oxidised with hydrogen peroxide, rinsed again, and dried.

The dyebath does not foam during the entire duration of the dyeing procedure. A level, fast, orange dyeing is obtained. According to the Monsanto standard, the rating is 3-4.

Example 4:

100 g of texturised polyamide 6,6 knitted fabric are dyed on a laboratory jet dyeing machine in 2.4 liters of water containing the following ingredients:

1.6 g of a dye of formula

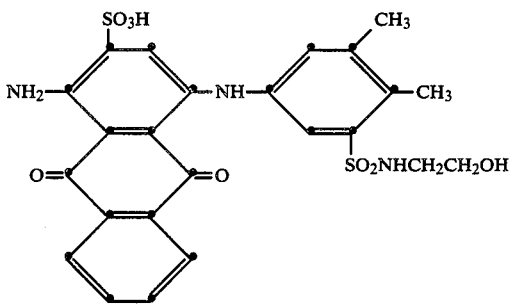
(106)

1 g of a condensate of 1 mole of fatty amine and 70 moles of ethylene oxide,
0.5 g of 80% acetic acid,
1 g of ammonium acetate, and
3 g of the graft polymer of Example 4.

Dyeing is commenced at 40° C., the above ingredients are diluted with water in the order indicated above and added to the dyebath. The temperature of the dyebath is then raised to boiling temperature (96° C.) and dyeing is carried out for 40 minutes at this temperature. The bath is then cooled to 50° C. over 10 minutes and the goods are wrung out and dried. No troublesome foaming occurs during dyeing. The fabric is dyed in a level blue shade. The rating is 3 according to the Monsanto standard.

Example 5:

100 g of cotton tricot are wetted on a winch beck in 4000 liters of water at 50° C. The following ingredients are then added:

3 kg of a dye of formula

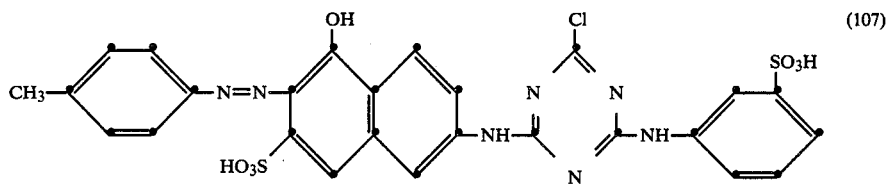
(107)

8 kg of sodium m-nitrobenzenesulfonate, and
3 kg of the graft polymer of Example 4.

After these ingredients have been homogenised, 160 kg of sodium chloride are added and the temperature is raised to 80° C. Then 12 kg of sodium hydroxide solution of 36° Bé are added.

After a running time of a further 45 minutes at 80° C., the goods are rinsed hot and cold and subsequently washed for 20 minutes at boiling temperature with 4 kg of the adduct of 9 moles of ethylene oxide and 1 mole of nonyl phenol and 3 kg of the graft polymer of Example 4 at a liquor to goods ratio of 1:40. The goods are subsequently rinsed once more and dried. No troublesome foaming occurs during the dyeing procedure. The dyed goods have a Monsanto standard rating of 4.

Example 6:

100 g of woollen serge (180 g/m$^2$) are dyed in 2.4 liters of water on a laboratory jet dyeing machine with the following ingredients:

A 2 g of 80% acetic acid
5 g of sodium sulfate (anhydrous)
3 g of the graft polymer of Example 2
B 0.5 g of a dye of formula

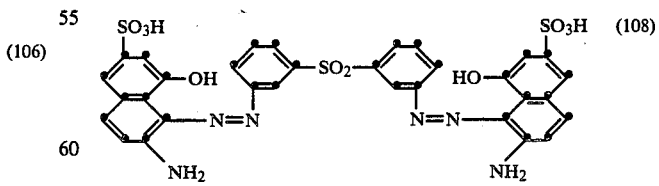
(108)

The ingredients A are first dissolved or dispersed in water and added to the dyebath at 50° C. After 5 minutes the dye (ingredient B) is added and the temperature is raised to 98° C. over 30 minutes and the goods are dyed at this temperature for 60 minutes. The bath is then cooled to 50° C. and the dyeing is rinsed and dried.

A fast, level, red dyeing with insignificant creasing of the fabric is obtained.

Example 7:

10 g of a blend of 55 parts of polyacrylonitrile and 45 parts of wool are treated in a laboratory dyeing machine (AHIBA) at 50° C. with a liquor containing:

0.3 g of ammonium sulfate
0.5 g of sodium sulfate
0.05 g of an amphoteric fatty amine polyglycol ether sulfate, and
0.3 g of the graft polymer of Example 2 in 400 ml of water and which has been adjusted to pH 2 with acetic acid.

The following ingredients are added after 5 minutes:

0.003% of the yellow dye of formula (109)

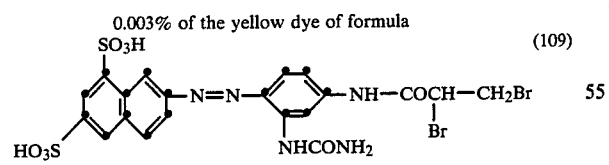

0.007% of the red of formula (110)

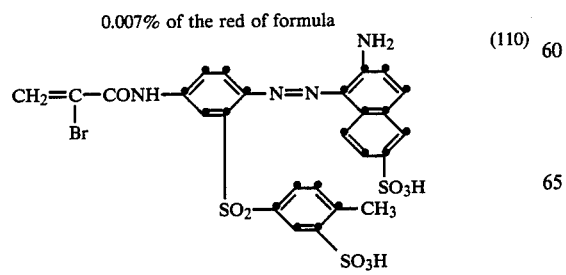

0.02% of the blue dye of formula (111)

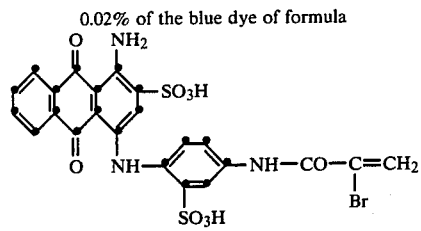

The temperature is then raised to 98° C. over 45 minutes and the fabric is kept for 15 minutes at this temperature. Then 0.02% of the dye of formula

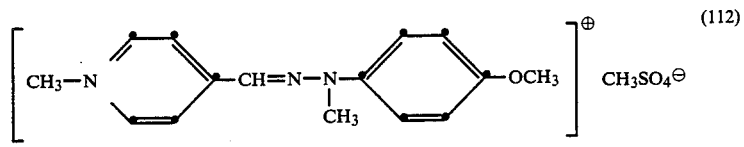
(112)

0.02% of the dye of formula

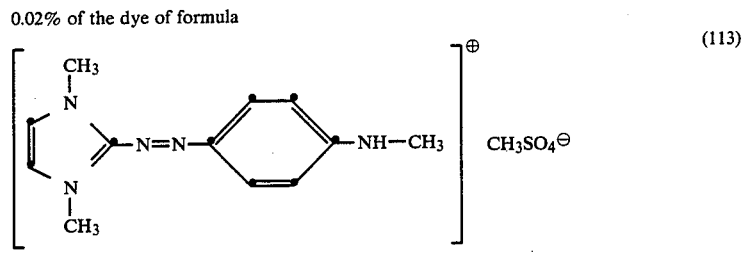
(113)

0.035% of the dye of formula

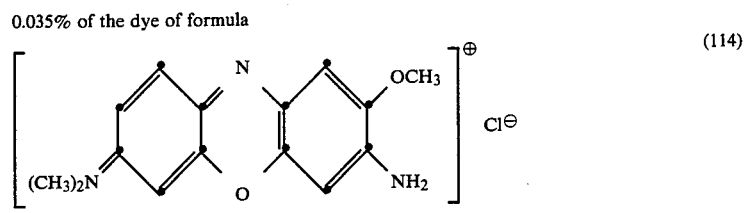
(114)

and 0.3% of the quaternary ammonium salt of formula

[cocosyl—N(CH₃)₃]⊕ Cl⊖ (115)

are added. The dyebath is adjusted to pH 4 with acetic acid and dyeing is carried out for 45 minutes at 98° C.

The dyebath is then cooled to 60° C. and the goods are rinsed and dried. A fast, level grey dyeing is obtained.

Example 8:

10 g of bleached and mercerised cotton tricot are treated at 20° C. in a dyeing machine (AHIBA) with a liquor containing 0.03% of a fluorescent whitening agent of formula

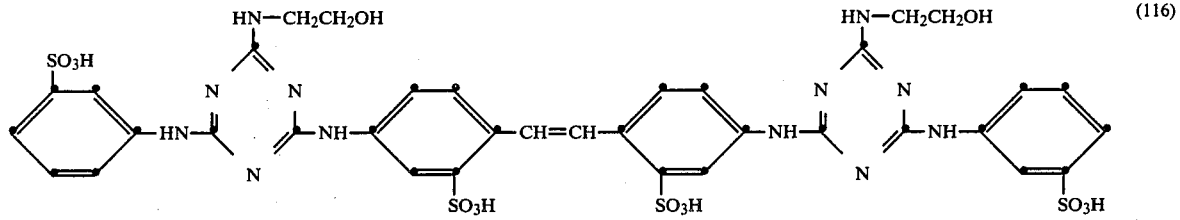

0.5% of sodium sulfate, and
0.3% of the graft polymer of Example 2 in 400 ml of water. The temperature is then raised to 80° C. over 30 minutes and the cotton is treated for 30 minutes at this temperature. The bath is then cooled to 50° C. and the goods are rinsed and dried. The whitened fabric is crease-free.

Example 9:

100 kg of a polyester/cotton blend (1:1) are washed at 80° C. for 20 minutes on a hank scouring machine at a liquor to goods ratio of 1:20 with a liquor containing the following ingredients:

2.5 g/l of a 2:1 mixture of coconut fatty acid diethanolamide and sodium 1-benzyl-2-heptadecylbenzimidazoledisulfonate, 2 g/l of sodium carbonate and 2 g/l of the graft polymer of Example 1.

The fabric is then rinsed cold and warm. After it has been washed, the fabric is almost crease-free.

Example 10:

Untreated cotton tricot is bleached at 90° C. for 15 minutes at a liquor to goods ratio of 1:40 in an aqueous liquor containing 2 g/l of sodium hydroxide (100%), 5 g/l of a 35% aqueous solution of hydrogen peroxide, 1 g/l of the graft polymer of Example 2, and 1 g/l of an aqueous wetting agent containing 43% of sodium pentadecane-1-sulfonate, 14% a $C_9$–$C_{11}$ fatty alcohol polyglycol ether and 5% of 2-ethyl-1-hexanol, based on the total wetting agent.

The bleached substrate is then washed for 1 minute at the boil and 1 minute cold, neutralised and dried. The bleached substrate has an excellent degree of whiteness and is in addition crease-free.

What is claimed is:

1. A water-soluble or water-dispersible graft polymer which comprises
   (A) as main chain, a polyalkylene glycol which is esterified at the two terminal hydroxyl groups with a fatty acid of 8 to 26 carbon atoms and
   (B) an ethylenically unsaturated monomer which is grafted in the form of side chains at individual carbon atoms of said polyalkylene glycol chain.

2. A graft polymer according to claim 1, wherein the main chain is a diester of a polyalkylene glycol obtained from 3 to 100 moles of an alkylene oxide.

3. A graft polymer according to claim 2, wherein the alkylene oxide is ethylene oxide.

4. A graft polymer according to claim 1, wherein the main chain is a diester of a polyethylene glycol obtained from 4 to 40 moles of ethylene oxide.

5. A graft polymer according to claim 1, wherein the polyalkylene glycol has a molecular weight of 300 to 1600.

6. A graft polymer according to claim 1, wherein the polyalkylene glycol is esterified with a fatty acid of 12 to 22 carbon atoms.

7. A graft polymer according to claim 1, wherein the polyalkylene glycol is esterified with a solid fatty acid.

8. A graft polymer according to claim 7, wherein the fatty acid is stearic acid.

9. A graft polymer according to claim 1, wherein the ethylenically unsaturated monmer contains a hydrophilic group.

10. A graft polymer according to claim 9, wherein the hydrophilic group is an acidic water-solubilising group.

11. A graft polymer according to claim 1, wherein the ethylenically unsaturated monomer is acrylic acid.

12. A graft polymer according to claim 1, wherein the ethylenically unsaturated monomer is acrylic amide.

13. A graft polymer according to claim 1, which comprises a polyethylene glycol obtained from 3 to 100 moles of ethylene oxide as main chain, onto which acrylic acid or acrylamide is grafted in the form of side chains, said polyethylene glycol being esterified with a fatty acid of 12 to 22 carbon atoms.

14. A graft polymer according to claim 13, which comprises a polyethylene glycol obtained from 4 to 40 moles of ethylene oxide as main chain, which polyethylene glycol is esterified with palmitic acid, stearic acid or behenic acid.

15. A graft polymer according to claim 14, which comprises a polyethylene glycol obtained from 6 to 15 moles of ethylene oxide as main chain, which polyethylene glycol is esterified with stearic acid.

16. A graft polymer according to claim 1 which comprises 15 to 80% by weight of esterified polyalkylene glycol as main chain and 85 to 20% by weight of grafted ethylenically unsaturated monomer as side chains.

17. A graft polymer according to claim 16, which comprises 20 to 75% by weight of esterified polyethylene glycol as main chain and 80 to 25% by weight of grafted acrylic acid or acrylamide as side chains.

18. An aqueous solution or emulsion which comprises a graft polymer according to claim 1.

19. A process for dyeing or whitening textile material containing cellulosic fibres, natural or synthetic polyamide fibres, polyacrylnitrile fibres or polyester fibres, with correspondingly suitable dyes or fluorescent whitening agents, which process comprises dyeing or whitening said textile material in the presence of the graft polymer according to claim 1.

20. A process according to claim 19, which comprises dyeing textile material containing polyester fibres with a disperse dye in the temperature range from 70° to 140° C.

* * * * *